J. W. SIMMONS.
THRUST BEARING FOR THE DIFFERENTIAL GEARING OF AUTOMOBILES.
APPLICATION FILED APR. 18, 1919.
1,334,265. Patented Mar. 16, 1920.
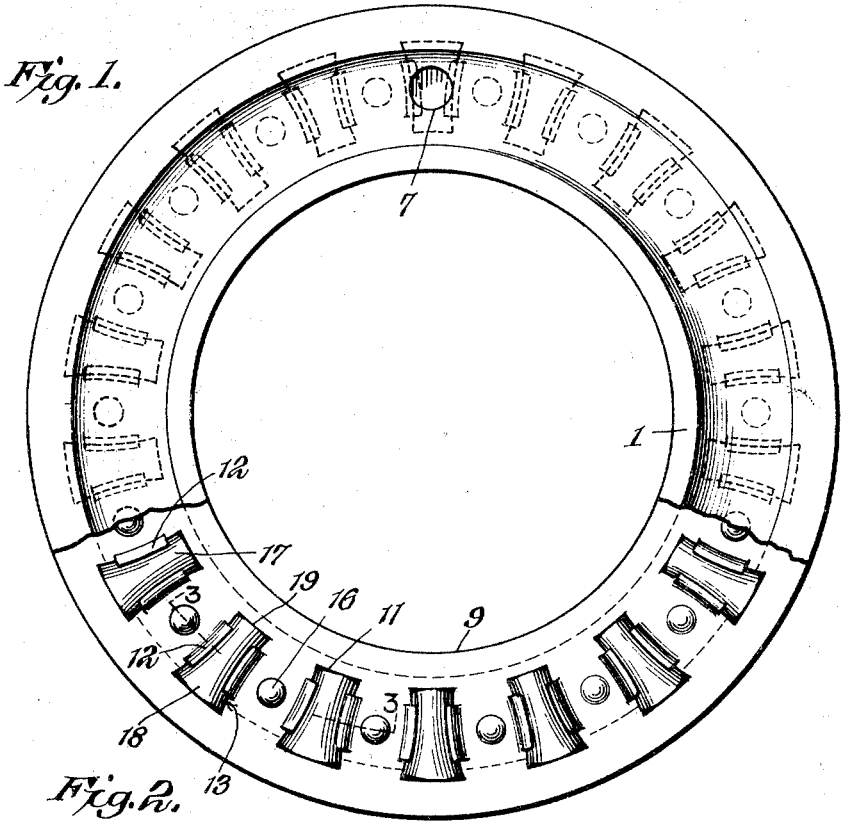
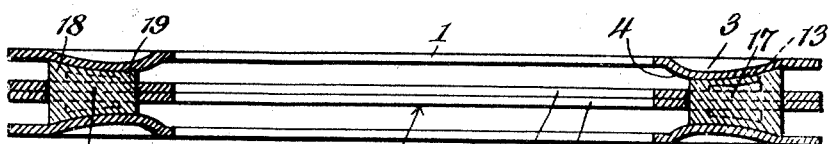
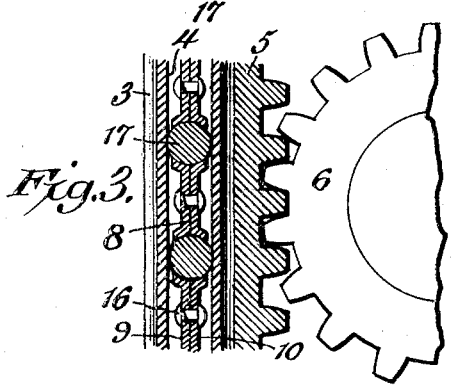
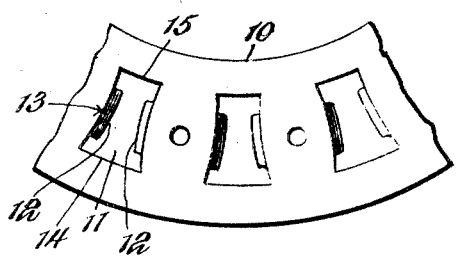
WITNESSES
Howard D. Orr.
F. T. Chapman.
John W. Simmons, INVENTOR,
BY E. J. Siggers
ATTORNEY

UNITED STATES PATENT OFFICE.

JOHN WOODARD SIMMONS, OF CLEVELAND, OHIO.

THRUST-BEARING FOR THE DIFFERENTIAL GEARING OF AUTOMOBILES.

1,334,265.

Specification of Letters Patent. Patented Mar. 16, 1920.

Application filed April 18, 1919. Serial No. 291,070.

*To all whom it may concern:*

Be it known that I, JOHN W. SIMMONS, a citizen of the United States, residing at Cleveland, in the county of Cuyahoga and State of Ohio, have invented a new and useful Thrust-Bearing for the Differential Gearing of Automobiles, of which the following is a specification.

This invention has reference to thrust bearings for the differential gearing of automobiles, and its object is to provide a thrust bearing for the purpose which is particularly resistant to wear and is highly efficient in the elimination of friction.

The invention is particularly adapted for use in connection with the differential gearing of the Ford and similar types of automobiles, although by no means confined to such particular types. In the named type of automobile the standard equipment comprises a pair of annular steel thrust plates with a soft metal annular plate between them. The purpose of the third annular plate or washer is to provide antifriction material between the hard steel thrust plates, which soft metal plate reduces rubbing friction and, so long as unworn, holds the members of the differential gearing in close relation. However, after an automobile equipped with such thrust bearing has traveled from three to five thousand miles, more or less, the soft metal annular washer or plate becomes worn to such an extent as to cause looseness between the intermeshing gearing of the differential, which wearing results in gear noise and also noise in the standard roller bearings provided for the axle members. Furthermore, the looseness so occurring is liable to cause accidents by bringing about breakage of parts.

The invention comprises a roller thrust bearing for the differential gearing so constructed and arranged that friction is reduced to a minimum and the thrust bearing is automatically centralized so as to reduce the strain upon the holding means, whereby the thrust plates or washers are held to the parts carrying them.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claim.

In the drawing:—

Figure 1 is a face view of a thrust bearing constructed in accordance with the invention, with some parts broken away to display more distant parts.

Fig. 2 is a diametric section through the structure shown in Fig. 1, the section being taken through opposite rollers.

Fig. 3 is a section on the line 3—3 of Fig. 1.

Fig. 4 is an inner face view of one of the elements of the roller retainer or cage.

Referring to the drawing, there are shown two annular thrust plates or washers 1, 2 respectively, each with an annular groove 3 on one face forming an annular projection 4 on the opposite face. The washers 1 and 2 may be of sheet form of even thickness or gage throughout, with the projections pressed or forged from the washer and subsequently suitably hardened.

The plates 1 and 2 are connected to one member of the rear axle of the automobile, as is usual, and the other plate or washer is connected to one member 5 of the differential gearing. In Fig. 3 there is shown a pinion 6 meshing with the gear 5, the pinion constituting the driving pinion fast to the drive shaft of the vehicle. It is customary to provide the thrust plates or washers 1 and 2 with suitably placed holes or passages 7 to receive pins projecting from the parts to which the thrust plates or washers are to be secured.

Between the adjacent faces of the plates 1 and 2, which plates, when installed, are spaced apart for the purpose, there is lodged a roller retainer or cage 8 composed of two like annular plates or washers 9, 10 respectively. The annular plates 9 and 10 are alike and each is provided with a circular series of substantially radial slots 11 having lips 12 formed integral with the opposite edges of the slot, these lips outstanding from one face of the plate or washer. The sides of each slot from which the lips project are of convex curvature, as indicated at 13, and one end 14 of each slot is wider in the direction of the circumference of the plate than the other end 15, which latter, being closer to the axis of the plate, may be termed the inner end, while the wider end 14 may be termed the outer end of the slot. The two plates 9 and 10 are secured together by rivets 16 traversing them between the slots, or any other suitable means for securing the plates 9 and 10 in face to face relation may be employed.

Seated in the cage 8 is a circular series of rollers 17, each of concave conical form so as to fit in the cage with the lips 12 partially embracing the mid or thin portion of the rollers, thereby holding them in the cage with sufficient projection beyond the outer edges of the lips to be engaged by the projecting surface 4 of the thrust washers 1 and 2. The rollers each have a relatively large outer end 18 and a smaller inner end 19 with a contracted central portion embraced by the retaining lips 12.

The concave conical rollers seated in the cage 8 serve to prevent any side play of the roller cage and avoid the necessity of means for holding the cage in its proper relation to the thrust washers 1 and 2. Moreover, each thrust washer is held by the roller cage against displacement with relation to the other thrust washer so that the whole structure is self-adjusting and undue strains are therefore taken from the retaining pins holding the thrust washers 1 and 2 to the parts carrying them.

The two plates may, as stated, be secured together by other means than the rivets 16. Among numerous ways in which the plates may be secured together, may be mentioned the use of the tongues projecting from the inner and outer peripheries of the plates, and, when the parts are assembled, the tongues of each plate are bent about the inner and outer margins of the companion plate and against the face thereof remote from the plate provided with the tongues so bent. The tongues may be produced on both plates and so arranged that when the plates are brought together the tongues are in staggered relation so as to not interfere one with the other.

What is claimed is:—

A differential gearing for automobiles provided with a thrust bearing comprising spaced thrust plates each having an annular projection on the face toward the other thrust plate, and an intermediately positioned roller retainer or cage consisting of two like annular plates secured together in face to face relation and each provided with an annular series of radial slots matching those of the other plate, said slots being wider at the outer end than the inner end and contracted intermediate of their length with each slot having lips on the long edges intermediate of their length and projecting outwardly from the plate, and rollers of concave conical form seated in the slots and held therein by the lips, said rollers being engaged by the annular projections on the neighboring faces of the thrust plates.

In testimony that I claim the foregoing as my own I have hereto affixed my signature.

JOHN WOODARD SIMMONS.